Figure 1:
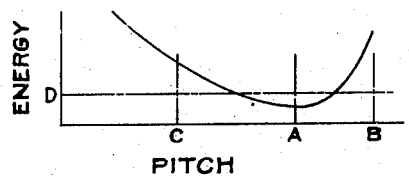

Nov. 25, 1930. H. C. SNOOK 1,782,912
METHOD FOR ELIMINATING NOISE IN MACHINERY
Original Filed July 31, 1925

INVENTOR
HOMER C. SNOOK
BY
ATTORNEY

Patented Nov. 25, 1930

1,782,912

UNITED STATES PATENT OFFICE

HOMER C. SNOOK, OF SOUTH ORANGE, NEW JERSEY, ASSIGNOR TO BELL TELEPHONE LABORATORIES, INCORPORATED, OF NEW YORK, N. Y., A CORPORATION OF NEW YORK

METHOD FOR ELIMINATING NOISE IN MACHINERY

Continuation of application Serial No. 47,299, filed July 31, 1925. This application filed June 15, 1927. Serial No. 199,017.

This application is a continuation of my application Serial Number 47,299 filed July 31, 1925.

This invention relates to an improved construction of casings or supports for gearing or other machinery of a kind which with ordinary casings or supports produce noise in operation, whereby such noise may be prevented or greatly reduced, and the invention includes also a method of reducing the noise-making characteristics of existing machinery to render it more quiet in operation without the necessity of rebuilding such machinery.

The invention has especial utility in connection with gear casings for automobiles. The elimination of gear noise has for years been an important problem to which the designers of automobiles have given much attention. The proposed solutions of this problem have, generally speaking, been to design gear cases with extra heavy walls, to provide ample oil-space between the gears and the wall, to construct the gears themselves with extreme accuracy so as to minimize the shocks produced by their interaction, and to muffle the noise by sound absorbing material.

The present invention proceeds upon a different plan, taking into account the peculiar sensitivity-characteristics of the human ear at different frequencies and energies of sound waves. The response of the average human ear has been well defined and the graph showing the threshold of audition is now well known. From this graph we find that vibrations having a frequency in the neighborhood of two to three thousand cycles per second are audible at a minimum amount of energy and that as the frequency changes in either direction it takes more energy to produce an audible sound. This invention then contemplates the reduction or elimination of noise, not by muffling or absorbing the vibrations produced in the normal operation of the gearing or other machinery but by changing the response characteristics of the casing surfaces which act as acoustic resonators. Stated as simply as possible the stiffness of the walls is altered so that the vibrations which are augmented lie not in the range of the more audible frequencies but in a range of the less audible frequencies. By so changing the stiffness of the casing walls the vibrations produced in the normal operation of the gearing or other machinery will be translated into air waves at frequencies either so low or so high that for any amplitude or intensity of such waves which the available energy so translated can produce, the average human ear will be nearly or quite insensitive thereto.

This alteration of stiffness may be made in either direction with equally satisfactory results and hence may be employed in the design of gear casings without disturbing or disrupting present day manufacturing processes. Given a small sized unit which is found to have walls which will most readily augment vibrations within the range of the more audible frequencies, such unit may be made practically noiseless in operation by stiffening its walls. This may be practiced by adding reinforcing ribs or bosses and dividing the surfaces into smaller and stiffer areas or it may be practiced by employing a different material which has a greater inherent stiffness. If the small size of the unit is not a vital factor then the walls may be made of the same thickness but of greater area so that the degree of stiffness is lessened. The effect of this change may be augmented by loading or weighting as by employing greater mass such as larger gears within the casing. In this latter case the response characteristics of the gear casing is changed to a lower frequency range.

Figure 2:
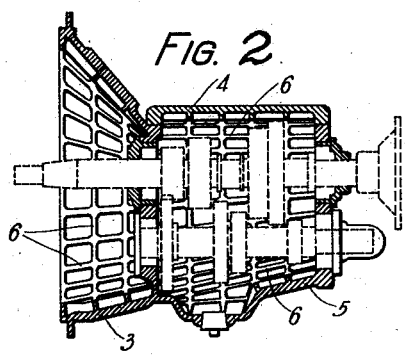
Figure 3:
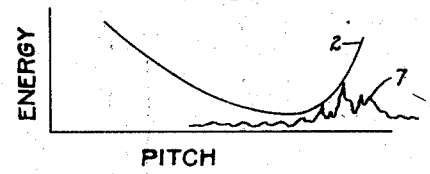
Figure 4:
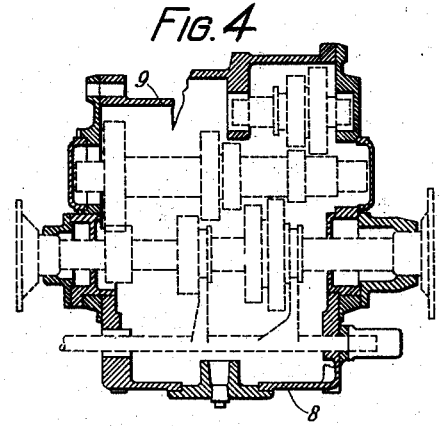
Figure 5:
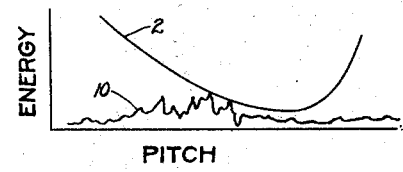

In the accompanying drawing, Fig. 1 is a curve representing the relations between the energy and pitch of sound waves and their audibility; Fig. 2 is a sectional view of a transmission gear unit having a casing constructed in accordance with the present invention; Fig. 3 is a graph illustrating the frequency-spectrum of the gear casing of Fig. 2, superposed upon the audibility curve; Fig. 4 is a sectional view of another transmission gear unit having a casing also constructed in accordance with the present invention; and Fig. 5 is a graph illustrating the frequency spectrum of the gear casing of Fig. 4, superposed upon the audibility curve.

In a paper published in the Journal of the Society of Automotive Engineers for July 1925, (Volume XVII No. 1) applicant has described means and methods for locating and measuring automobile noises, and has discussed the principles of acuity of hearing, with curves illustrating the sensitivity of the human ear to sound waves of different energy and pitch. Such a curve is given in Fig. 1 of the drawing accompanying this application, and shows that as the frequency of sound waves increases from about sixteen cycles per second to about 3000 cycles per second the amount of energy required to produce audible sound decreases, while as the frequency increases much beyond 3000 cycles, the energy required to produce audible sound increases until the limit of audibility is reached. Thus as shown in Fig. 1 the energy required to produce an audible vibration having the pitch A is less than the energy required to produce a vibration of the pitch B or the pitch C. In other words, a vibration of the pitch A having the energy D would be audible, while a vibration having the pitch B or the pitch C and the energy D would be inaudible.

As pointed out in the paper above referred to, an automobile can be considered from the standpoint of noise production as comprising a number of acoustic resonators having varying degrees of coupling between them. The gear casing is such a resonator, and is set in vibration by the action of the gears communicated through the bearings which are mounted in the casing, and through the air and grease between the gears and the walls of the casing. In an ordinary gear casing the natural periods of resonance are such that the vibrations set up by the normal operation of the gears will be of such amplitudes and frequencies that an audible, and, in many cases, a disagreeably loud noise or "whine" is produced. The best methods heretofore proposed for reducing this noise have been to reduce the vibration at the source by very accurate shaping of the gears, or to muffle the sound by absorbing the vibrations in packing material. If the sounds radiated by a gear casing of ordinary construction, under normal conditions of operation, are analyzed and measured as by the instruments and methods described in the paper above referred to, a graph may be obtained, showing the sound energy radiated at different frequencies, and this graph which may be termed the "frequency spectrum" of the gear casing in question will show a number of resonance peaks all lying within the range of frequencies at which sound waves of relatively small energy will be audible.

If now the gear casing is sufficiently stiffened by the provision of integral ribs or bosses upon the vibrating surfaces, or otherwise, the frequency spectrum will be shifted so that the natural resonance peaks of the casing under normal operation of the gears will be of such higher frequencies that at the values of the air-wave energy radiated in the normal operation of the gears the vibrations will lie mainly outside the limit of audibility.

Fig. 2 shows a gear case for a heavy duty omnibus constructed in accordance with this invention. The stiffening ribs placed on the various walls 3, 4 and 5 are indicated by the reference numeral 6. In Fig. 3 the frequency spectrum of this gear case indicated by the reference numeral 7 is superposed upon the audibility curve 2, and it will be seen that the resonance peaks in the frequency spectrum are at higher frequencies than with the conventional casing, and that the whole frequency spectrum lies generally outside of the area defined by the audibility curve.

Fig. 4 shows a gear case for a heavy duty omnibus actually constructed in accordance with this invention. In this instance the stiffening of the walls was lessened by increasing their areas and the unit was loaded or weighted by using greater mass.

It will be noted for instance that wall 8 of Fig. 4 is somewhat thinner than the corresponding wall 5 of Fig. 2 and wall 9 is somewhat thinner than the corresponding wall 4. Fig. 2 and Fig. 4 though shown in the conventional manner required on patent application drawings are in reality scale drawings of the two heavy duty omnibus gear cases the former of which without the ribs shown therein was found to be noisy in practice whereas the latter proved to be particularly noiseless. In Fig. 5 the frequency spectrum indicated by the numeral 10 of the gear casing shown in Fig. 4 is superposed on the audibility curve 2 and it will be seen that the resonance peaks in the frequency spectrum are at lower frequencies than with the conventional casing, and that the whole frequency spectrum lies generally outside of the area defined by the audibility curve.

The frequency spectrum shown in Fig. 5 represents the results of actual audiometric measurements made by the use of a frequency analyzer of the general character described in the paper above referred to. The frequency spectrum in Fig. 3 represents the results obtained from actual experiments made on a gear case of another well known automobile where a set of gears which proved to be noisy in one gear case were transferred bodily to another gear case identical with the first except for the addition of stiffening means and there proved to be noiseless.

From a consideration of the foregoing, it should be apparent that merely making the housing or support for machinery heavy and massive or merely adding reinforcing ribs will not necessarily accomplish the desired result. To make the casing thicker will, of course, add to the stiffness of the surface as a whole, but the mass will also be increased, and the increase of mass may tend to lower the resonance point as much as the increase in stiffness will tend to raise it. The mere addition of reinforcing ribs, such as heretofore proposed for strengthening or heat radiating purposes, will increase the stiffness of the surfaces to which such ribs are applied; but this may result merely in producing more pronounced resonant peaks in such a frequency range that with the available energy the noise will be increased rather than diminished by such ribs. It should be borne in mind that, as shown by a consideration of Figs. 1 and 5, the objective in stiffening the casing is not merely to raise the frequency at which resonance peaks will occur, but to divide the vibrating surfaces into such small areas and to stiffen these areas to such a degree, relatively to the mass of the vibrating parts and the energy which will necessarily be translated into vibration at those frequencies in the normal operation of the machinery, that the whole frequency spectrum will be shifted to a range lying outside the range of frequencies at which the available energy translated into vibrations at those frequencies would be detected by the human ear. It is thus the peculiar sensitivity characteristics of the human ear, rather than any absolute resonance frequencies, that must be given chief consideration in determining the design of a support or casing to avoid noise; it being assumed, of course, that the machinery itself will be so designed as to minimize the amount of energy that will be translated into unwanted vibrations.

It is evident that it is desirable to have accurate acoustic measuring apparatus for locating and analyzing sound, and that in designing new casings it may be of help to proceed upon the basis of mathematical calculation in determining the form and dimensions of the casing and of the ribs or other reinforcements, taking into account the material used and the amount of energy which will be necessarily translated into air waves in the normal operation of the machinery. As a practical matter, however, it is unnecessary to use mathematical calculation to arrive at the desired result, if the underlying scientific principles of the invention are understood and intelligently applied.

By the application of these principles, it is possible to produce a transmission unit for automobiles, for example, which will be really noiseless in operation (that is, so that the sound of the gears cannot be detected by a person seated in the car or standing beside it) without the necessity of using extremely accurate gears; and even an old car with worn gears may be made quiet in operation, (so far as gear noises are concerned) by the methods above described.

In the design of the gear casings in question no attempt was made to calculate exactly the dimensions of the walls and the locations of the stiffening ribs where such stiffening ribs were used to secure the maximum possible shifting of the frequency spectrum, but the effect of the practical application to gear casing design of the principles disclosed in this application is plainly apparent. By further dividing up and stiffening of the surfaces of the casing shown in Fig. 2, the frequency spectrum could be shifted still further into the range of inaudibly high frequencies, or by further lessening the stiffness of the walls of the casing shown in Fig. 4, the frequency spectrum could be shifted still further into the range of inaudibly low frequencies.

The material of which the casing is made may play an important part in determining the dimensions of the casing walls necessary to insure quietness in operation. Material of very great stiffness and low specific gravity (small mass per unit volume) is desirable, and certain alloys having these characteristics as well as the necessary mechanical strength will require less stiffening by special ribs or bosses to realize the advantages of this invention; and in some cases where casings of a conventional design are small and do not present large vibrating areas, the necessary stiffness may be obtained without the addition of special ribs or bosses, by the use of an alloy which has naturally very great stiffness and low specific weight.

As a rough but practical way of applying this invention to the improvement of gear casing design without the necessity of mathematical calculations, a gear casing of the conventional type may be explored acoustically by any of the methods known to the art, such as are described in the paper above referred to, and those vibrating surfaces located from which the maximum sound proceeds. The casing may then be redesigned to provide for substantial reinforcing ribs extending across the surfaces which, in the old design, were found to be the chief sound radiators, and if this is done with intelligence and with an understanding of the principles herein set forth the redesigned casing will probably be found satisfactory, although it may be necessary (in the absence of exact calculations) to repeat the procedure by acoustically exploring the redesigned casing and correcting in the same manner any noise producing characteristics it may have in the normal operation of the machinery. This can be acomplished without requiring abnormal increase in weight or sacrifice of mechanical strength, conventional appearance or economy of manufacture, and without departure from accepted manufacturing methods.

By properly altering the stiffness of the support or casing in accordance with the principles herein disclosed, as by dividing and reinforcing the surfaces by ribs or bosses or by making the walls more extensive and more flexible or by employing material of the requisite natural stiffness and low specific weight, the energy transformed into air waves by the unavoidable vibrations set up in the operation of the machinery may be translated or radiated at frequencies which lie wholly or mainly outside the range of frequencies to which the average human ear is sensitive at any amplitudes or intensities of such waves which the normal operation of the machinery is capable of producing.

The invention may also be applied in the same way for the improvement of existing gear cases or supports for vibration producing machinery, by acoustically locating the surfaces of maximum sound radiation and then securing as by welding or brazing, reinforcing ribs across those surfaces, to divide and stiffen such surfaces to the degree necessary for quiet operation.

What is claimed is:

1. The method of designing housing walls for machinery, which consists in ascertaining the tone most readily transmitted by such walls, ascertaining the energy transmitted to such walls under the normal operation of such machinery and changing the stiffness of such walls to a point where the tone most readily transmitted requires an amount of energy greater than that available.

2. The method of designing housing walls for machinery, which consists in ascertaining the tone most readily transmitted by such walls, ascertaining the energy transmitted to such walls under the normal operation of such machinery and decreasing the stiffness of such walls to a point where the tone most readily transmitted requires an amount of energy greater than that available.

3. The method of designing housing walls for machinery, which consists in ascertaining the tone most readily transmitted by such walls, ascertaining the energy transmitted to such walls under the normal operation of such machinery and increasing the stiffness of such walls to a point where the tone most readily transmitted requires an amount of energy greater than that available.

In witness whereof, I hereunto subscribe my name this 14th day of June, A. D., 1927.

HOMER C. SNOOK.